United States Patent
Logvin et al.

(10) Patent No.: US 7,609,931 B2
(45) Date of Patent: Oct. 27, 2009

(54) PLANAR WAVEGUIDE STRUCTURE WITH TIGHTLY CURVED WAVEGUIDES

(75) Inventors: Yury Logvin, Ottawa (CA); Serge Grabtchak, Welland (CA); Kirill Pimenov, Orleans (CA)

(73) Assignee: Enablence, Inc., Kanata (CA)

( * ) Notice: Subject to any disclaimer, the term of this patent is extended or adjusted under 35 U.S.C. 154(b) by 0 days.

(21) Appl. No.: 11/473,242

(22) Filed: Jun. 23, 2006

(65) Prior Publication Data

US 2007/0031083 A1 Feb. 8, 2007

Related U.S. Application Data

(63) Continuation-in-part of application No. 10/826,504, filed on Apr. 19, 2004, now abandoned.

(60) Provisional application No. 60/463,685, filed on Apr. 18, 2003.

(51) Int. Cl.
G02B 6/10 (2006.01)
(52) U.S. Cl. .................. 385/129; 385/17
(58) Field of Classification Search .......... 385/15, 385/31, 32, 39, 42, 45
See application file for complete search history.

(56) References Cited

U.S. PATENT DOCUMENTS

| 4,810,049 | A | * | 3/1989 | Fischer et al. ............... 385/132 |
| 4,900,119 | A | * | 2/1990 | Hill et al. ...................... 385/27 |
| 5,050,952 | A | * | 9/1991 | FussgaKurt .................. 398/44 |
| 5,479,547 | A | * | 12/1995 | Kunikane et al. ............. 385/47 |
| 5,579,154 | A | * | 11/1996 | Mueller-Fiedler et al. ....................... 359/341.1 |
| 5,629,999 | A | * | 5/1997 | Henry et al. .................. 385/43 |
| 5,644,737 | A | * | 7/1997 | Tuniman et al. ............ 715/810 |
| 5,778,118 | A | * | 7/1998 | Sridhar ........................ 385/24 |
| 5,889,899 | A | * | 3/1999 | Henry et al. .................. 385/10 |
| 6,061,481 | A | * | 5/2000 | Heidrich et al. ............... 385/14 |
| 6,084,694 | A | * | 7/2000 | Milton et al. ................. 398/83 |
| 6,212,307 | B1 | * | 4/2001 | Labeye et al. ................. 385/14 |
| 6,240,221 | B1 | * | 5/2001 | Thompson .................... 385/14 |
| 6,310,994 | B1 | * | 10/2001 | Jones et al. ................... 385/24 |
| 6,483,966 | B2 | * | 11/2002 | Bona et al. .................... 385/43 |
| 6,493,117 | B1 | * | 12/2002 | Milton et al. ................. 398/49 |
| 6,773,615 | B1 | * | 8/2004 | Rogers et al. ................. 216/24 |
| 6,813,405 | B1 | * | 11/2004 | Bendett et al. ................ 385/14 |
| 6,819,859 | B2 | * | 11/2004 | Hatayama et al. ........... 385/140 |
| 6,904,203 | B2 | * | 6/2005 | Logvin et al. ................. 385/37 |
| 7,120,335 | B2 | * | 10/2006 | Agarwal et al. ............... 385/39 |
| 7,206,470 | B2 | * | 4/2007 | Li et al. ......................... 385/14 |
| 7,212,697 | B2 | * | 5/2007 | Spott et al. .................... 385/14 |
| 2002/0150366 | A1 | * | 10/2002 | Loncar et al. ............... 385/125 |
| 2003/0035633 | A1 | * | 2/2003 | Agarwal et al. .............. 385/49 |

OTHER PUBLICATIONS

Kitoh et al. Bending loss reduction in silica-based waveguides by using lateral offsets., Journal of lightwave technology 1995, vol. 13, No. 4, pp. 555-562.*

(Continued)

*Primary Examiner*—Frank G Font
*Assistant Examiner*—Peter Radkowski
(74) *Attorney, Agent, or Firm*—Teitelbaum & MacLean; Neil Teitelbaum; Doug MacLean (57) ABSTRACT

Ridge and buried waveguide structures feature a plurality of trenches disposed proximate the waveguides in order to enhance confinement of an optical signal propagating within the waveguide are described. Additionally, an adiabatic transition region where the distance between trenches and waveguide is featured.

33 Claims, 5 Drawing Sheets

OTHER PUBLICATIONS

Ladouceur et al. A new general approach to optical waveguide path design. Journal of lightwave technology 1995, vol. 13, No. 3, pp. 481-492.*

Chulhun et al. Low transition losses in bent rib waveguides. Lightwave Technology, Journal of vol. 14, Issue 10, Oct. 1996, pp. 2255-2259.*

Seo et al. Optical bent rib waveguide with reduced transition losses. Magnetics, IEEE Transactions on vol. 32, Issue 3, Part 1, May 1996, pp. 930-933.*

Cohn et al. TE Mode Excitation on Dielectric Loaded Parallel Plane and Trough Waveguides. Microwave Theory and Techniques, IEEE Transactions on vol. 8, Issue 5, Sep. 1960, pp. 545-552.*

Mustieles et al. Theoretical S-bend profile for optimization of optical waveguide radiation losses. Photonics Technology Letters, IEEE vol. 5, Issue 5, May 1993, pp. 551-553.*

Yamauchi et al. Analysis of bent step-index optical fibres by the beam propagation method. Optoelectronics, IEE Proceedings J vol. 139, Issue 3, Jun. 1992, pp. 201-207.*

Yamauchi et al. Beam-propagation analysis of bent step-index slab waveguides. Electronics Letters vol. 26, Issue 12, Jun. 7, 1990, pp. 822-824.*

Popovic et al. Air trenches for sharp silica waveguide bends. Lightwave Technology, Journal of vol. 20, Issue 9, Sep. 2002, pp. 1762-1772.*

Wada et al. Micron-size bending radii in silica-based waveguides. Advanced Semiconductor Lasers and Applications/Ultraviolet and Blue Lasers and Their Applications/Ultralong Haul DWDM Transmission and Networking/WDM Components, 2001 Digest of the LEOS Summer Topical Meetings Jul. 30-Aug. 1, 2001, pp. 13-14.*

Smit et al. A normalized approach to design of low-loss optical waveguide bends, vol. 11, No. 11, Nov. 1993, pp. 1993-1997.*

* cited by examiner

PLANAR WAVEGUIDE STRUCTURE WITH TIGHTLY CURVED WAVEGUIDES

CROSS REFERENCE TO RELATED APPLICATIONS

This application is a continuation in part of U.S. patent application Ser. No. 10/826,504, filed Apr. 19, 2004, which claims the benefit of U.S. Provisional Application No. 60/463,685 filed Apr. 18, 2003.

FIELD OF THE INVENTION

This invention relates to integrated waveguide devices used in optical communications that are produced from planar waveguide substrates and more particularly to propagating optical signals within curved waveguides disposed within a substrate.

BACKGROUND OF THE INVENTION

Optical components are extensively used in data communication networks. Typically these components are designed to manipulate light having a single mode. Advances in optical technology have provided integrated optical devices that permit more complex optical components and combinations of optical components to be produced on a single optical chip. When the optical chip relies of on weakly guiding waveguides, it is often difficult to provide a curved waveguide whose radius of curvature is sufficiently low to permit a set of optical components on a same to chip to be located in close proximity to each other. Additionally, when the radius of curvature of a curved waveguide is high it often becomes difficult to position the waveguides such that the surface area of substrate is used effectively. Since the substrate is likely to be very costly, it is very beneficial to use a minimal amount of surface area.

While advances in total-internal-reflection (TIR) mirrors allow turning mirrors to be disposed on optical substrates in some applications it is often the case that these mirrors have insertion loss in the order of 1.0 dB. While this may be acceptable in some applications it is not acceptable for others and generally it is beneficial to minimize the insertion loss of optical components.

In U.S. Pat. No. 4,983,006, Hishimoto describes a polarization independent optical waveguide switch. The switch features two curved waveguides that approach each other forming an "X" shape in a top view of the device. This patent clearly demonstrates the usefulness of tightly curved waveguides in optical switching. The waveguides used in this prior art patent are widened near the junction where they are parallel. Hishimoto explains that a higher index contrast is desirable in a curved waveguide in order to enhance confinement of the optical signals as they propagate within the curved waveguide. While the thicker waveguides decrease radiation loss, and hence suggest improved confinement, the radius of curvature used by Hishimoto is still relatively large.

In U.S. Pat. No. 5,511,142, Horie et al. discuss a variety of different ridge waveguide structures intended for use with curved waveguides. The ridge waveguides described by Horie et al. have sections that are not flat. Thus, the ridge is designed to enhance confinement of light propagating within the curved waveguide on the inside of the curve of the waveguide while providing weaker guiding on the outside the waveguide thereby assisting the redirection of the light around the curve. While this prior art is superior to a conventional flat ridge waveguide the enhancement in terms of minimum radius of curvature is modest because the waveguide is still a weakly guiding waveguide. Additionally, it is felt that the processing of such a waveguide is more complex than the processing of a move conventional waveguide device.

In the paper "Air trenches for sharp silica waveguide bends", IEEE Journal of Lightwave Technology, v. 20, p. 1762 (2002), the authors M. Popovic et al. suggested an adiabatic taper from a low-index contrast to high-index contrast waveguide structure combined with a high-index contrast bend. Along with the obvious advantages of the structures especially for the implementation of the small radius bends, there are several drawbacks. Namely, there is a junction between the different waveguide structures where a mode mismatch loss is likely to be very significant. Additionally, the fabrication of the taper is questionable because it requires very accurate alignment of the masks used at different etching processes.

It would be beneficial to provide integrated waveguide substrates having curved waveguides, the curved waveguides having a relatively low radius of curvature and low optical losses. Further, it would be beneficial to provide this type of waveguide without resorting to unconventional and costly production techniques.

SUMMARY OF THE INVENTION

In accordance with the invention there is provided a waveguide structure comprising:
 a substrate, the substrate for support a waveguide;
 a waveguide; comprising;
  a first straight waveguide, the straight waveguide for receiving an optical signal for propagation;
  a curved waveguide, the curved waveguide being curved and having local radii of curvature, having an input port connected to the straight waveguide, and output port;
  a second straight waveguide, the straight waveguide coupled to the output of the curved waveguide and for the optical signal propagated through the first straight waveguide and curved waveguide;
  a plurality of first trenches disposed along a first side of at least the curved waveguide, the plurality of trenches having a material deposited within where the material has a lower index of refraction of at least one of the waveguide core and waveguide cladding; wherein,
 each of the plurality of first trenches adjusting a confinement of the optical signal, the confinement being higher than the curved waveguide alone without trenches.

According to another aspect of the invention there is provided a waveguide structure additionally comprising:
 a plurality of second trenches disposed along a second side of at least the curved waveguide, the plurality of second trenches having a material deposited within where the material has a lower index of refraction of at least one of the waveguide core and waveguide cladding; wherein,
 each of the plurality of trenches adjusting a confinement of the optical signal, the confinement being higher than the curved waveguide alone without trenches.

BRIEF DESCRIPTION OF THE DRAWINGS

The invention is now described with reference to the accompanying figures in which.

FIG. 5b is a first section view of a curved section of the waveguide structure illustrated in FIG. 5a.

FIG. 5c is a second section view of a curved section of the waveguide structure in FIG. 5a.

FIG. 8 is a top view of a straight waveguide according to another embodiment of the invention featuring trenches of varying length and spacing disposed on either side of a curved waveguide; and, FIG. 9 is a graph showing confinement and distance for an adiabatic transition.

DETAILED DESCRIPTION OF THE INVENTION

Figure 1:
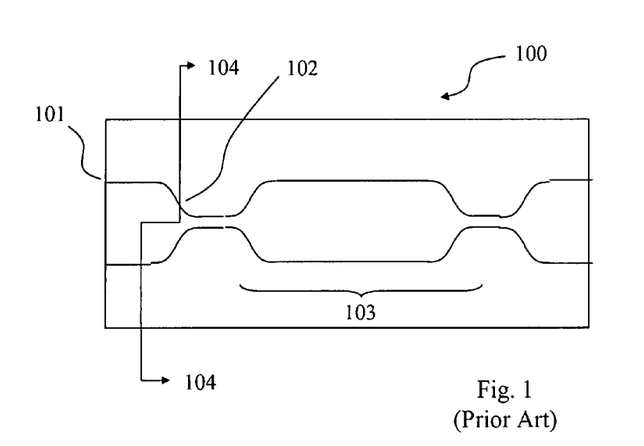
FIG. 1 is a top view of a prior art Mach-Zender interferometer disposed on waveguide structure.

Referring to FIG. 1, a prior art waveguide substrate 100 is shown. The waveguide substrate includes an input port 101, a curved waveguide 102, and a Mach-Zender interferometer 103. A section line 104 is also shown. The radius of curvature has been chosen to ensure that the weakly guiding waveguide continues to determine the path of propagation of the optical signal. If the radius of curvature of the curved waveguide is reduced then the curved waveguide will be unable to confine the optical signal. As a result, the light begins to dissipate within the waveguide and no longer propagates proximate the ridge of the ridge waveguide. The size of the device is constrained by the minimum radius of curvature of the curved waveguide 102. A tighter radius of curvature will permit smaller Mach-Zender Interferometers to be produced.

Figure 2:
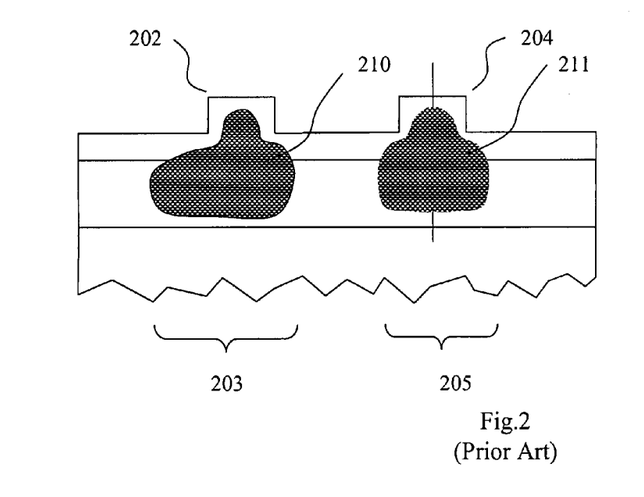
FIG. 2 is a section view of a prior art waveguide indicating an intensity profile of optical signals propagating therein.

Referring to FIG. 2, a section view of the waveguide substrate is shown in FIG. 1 including a curved ridge 202 over a curved waveguide region 203 and a straight ridge 204 over a straight waveguiding region 205. A first optical intensity profile 210 is superimposed over the curved waveguide region 203 and a second intensity profile 211 is superimposed over the straight waveguide region 205. As can be seen, the intensity profile 211 of the optical signal propagating within the straight waveguide region 205 is symmetric about the center of the ridge waveguide. As can be seen, the first intensity profile 210 is not symmetric about the center of the ridge waveguide 203, while the second intensity profile 211 is symmetric about the straight waveguide region 205.

Although the prior art example demonstrates a ridge waveguide structure, a person of skill in the art of waveguide design will appreciate that light propagating within curved and straight buried waveguides is guided in an analogous manner.

Figure 3:
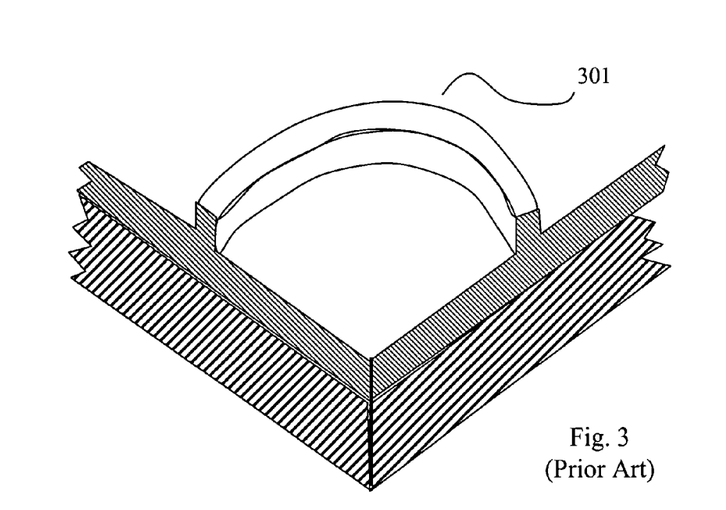
FIG. 3 is an isometric view of a curved waveguide according to the prior art in which the waveguide has been made thicker in the curved region.

Referring to FIG. 3, a prior art waveguide structure is shown. Horie et al. FIG. 26 describe this waveguide structure in detail in U.S. Pat. No. 5,511,142. In order to provide better confinement of light propagating within a weakly guided curved ridge waveguide, the thickness of the ridge 301 is varied to increase in a region where more guiding is desired and decrease in a region where less guiding is desired. Additionally, Horie modifies the local index of refraction such that it is higher along the inside of the curve further improving the confinement of the optical signal propagating therethrough. The techniques associated with the forming of this structure are unconventional. Forming a ridge waveguide with differing heights along the ridge typically involves many separate etching steps or highly specialized equipment capable of extremely precise etching.

Figure 4:
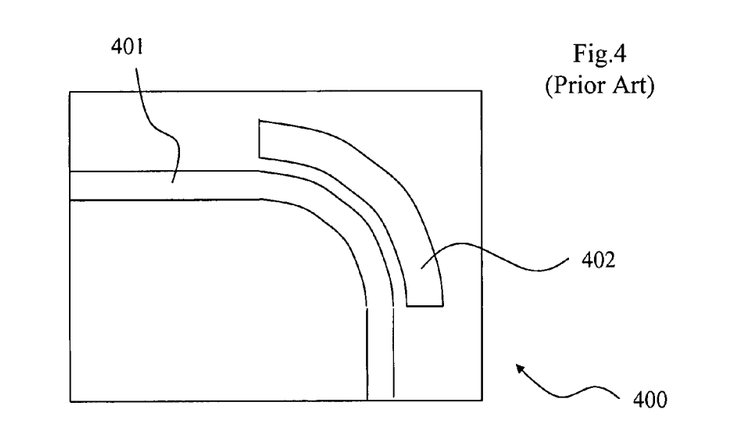
FIG. 4 is a top view of a curved ridge waveguide according to the prior art in which a trench is disposed proximate a ridge waveguide in order to enhance the guiding a light within the waveguide

Referring to FIG. 4, a prior art waveguide structure is shown. The waveguide structure 400 includes: a ridge 401 with a radius of curvature, and a trench 402 with a radius of curvature. The trench 402 is positioned parallel to the ridge 401 such that the trench 402 will have a larger radius of curvature than the ridge 401. In this embodiment air is present in the trench 402, and therefore, the trench has a material therein having a very low index of refraction in comparison with the waveguide substrate. Thus, the confinement of the optical signal is significantly increased thereby causing an optical signal propagating along the waveguide to follow the curve of the ridge waveguide. This technique allows the minimum radius of curvature of the curved ridge waveguide to be much smaller than possible with the prior art as described with reference to FIG. 1 to FIG. 3.

Figure 5A:
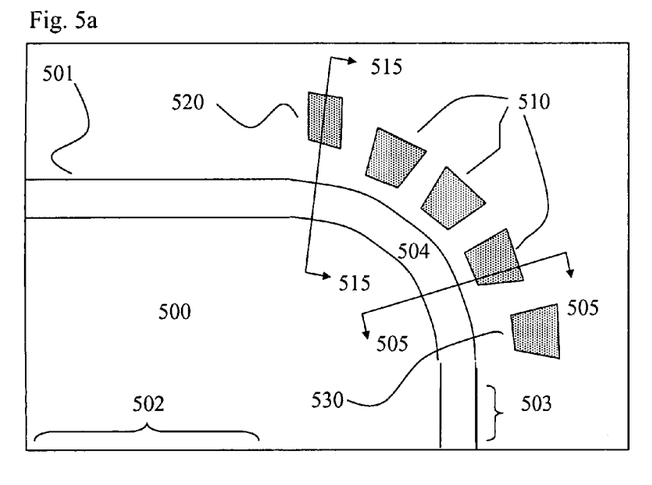
FIG. 5a is a top view of a waveguide bend structure according to the invention featuring a plurality of trenches on one side of the waveguide.

Referring to FIG. 5a, a first embodiment of the invention is shown. In this embodiment, a waveguide structure 500 includes a ridge waveguide 501 having a first straight portion 502 without trenches, a curved portion 504 with trenches 510, 520 and 530, and a third portion 503 without trenches. Within the curved portion 504 an optical signal propagating transitions from the straight waveguide portion 502 to the first section of the curved waveguide portion 504 wherein a first trench 520 serves to enhance confinement of the optical signal within the waveguide portion. The first trench 520 being positioned to provide a first step of enhancement in confinement factor of the optical signal.

The optical signal then propagates to a second section of the curved waveguide portion 504 proximate a plurality of second short trenches 520, which are disposed on the outside curve of the ridge waveguide 501. The plurality of second short trenches 520 being positioned to provide a second step of enhancement of the confinement factor of the optical signal. This second step of enhancement being achieved by placement of the second trenches 520 closer to the ridge waveguide 501 than the first trench 520.

The optical signal having propagated along the majority of the curved portion bend 504 transitions to the third section wherein a third trench 530 serves to enhance the confinement of the optical signal to the first step of confinement factor of the optical signal. From this third section of the curved waveguide portion 504 the optical signal propagates into the third portion 503 without trenches.

It will be evident to one skilled in the art that the controlled enhancement of the confinement factor as the optical signal propagates through the curved waveguide section allows for a reduction in loss through the waveguide and that the radius of the curved portion is optionally reduced allowing increased integration of integrated optical circuits using this invention or reduced die size for reduced cost. It might not be evident however that the invention also allows for control of the polarization properties of the waveguide bend and also allows for enhanced isolation between closely spaced waveguides forming part of a waveguide routing element or fan-out of waveguides from a narrow pitch to a wider pitch.

Figures 5B, 5C:
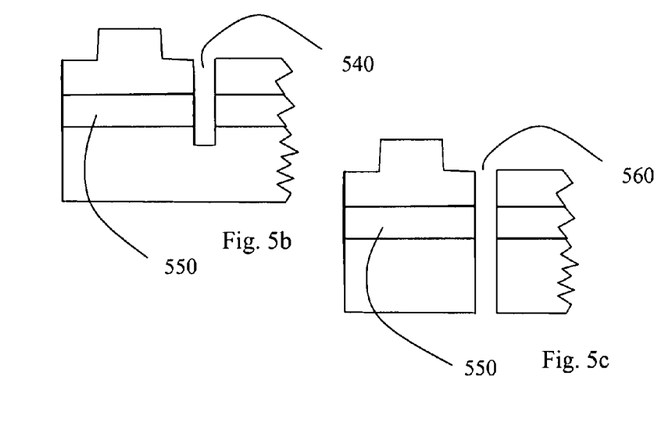

Referring to FIG. 5b a sectional view of the waveguide structure of FIG. 5a is shown. The section view along section line 515 illustrates the depth of the trenches. The trench 540 is illustrated as having a depth somewhat deeper than the base of a waveguide core layer 550.

Referring to FIG. 5c a second sectional view of the waveguide structure of FIG. 5a is shown. The section view along section line 505 wherein the trench 560 is illustrated as having a depth perforating the substrate 550.

A person of skill in the art will be aware that once the depth of a trench has reached a certain point making the trench deeper will have a minimal effect on the waveguiding properties of the waveguide structure 500. Typically, it would be expected that a designer of skill in the art would ensure that the trench does not penetrate the entire depth of the waveguide structure 500 in order to maintain the structural strength of the waveguide structure 500. As a person of skill in the art will be aware, the distance between the trenches and the ridge waveguide 501 will determine the effect that the trenches have on an optical signal propagating within the waveguide 501. When the trenches are disposed far from the waveguide 501 the effect of the trenches is minimal. Thus, in the transition regions the trenches 505 and 520 are disposed far from the waveguide 501. In the central section however the trenches 510 approach the waveguide closely to permit relatively narrow confinement of the optical signal without a loss of energy of the optical signal. Thus, when the optical signal propagates from a region of the waveguide with trenches to a region of the waveguide without trenches energy in the optical signal remains in a lowest order singlemode. A person of skill in the art of waveguide design would describe this transition as adiabatic. Thus, in a first region of the waveguide structure, the waveguide structure is weakly confining to optical signals propagating therein. In a second region, the waveguide structure features a more robust confinement of optical signals propagating therein. The structure also supports a near adiabatic transition from the weakly confining region to the robust confinement region.

Advantageously in some embodiments the use of multiple short trenches provides additional design flexibility in that the positioning of the short trenches in spacing away from the ridge waveguide, as well as the lengths of the trenched and untrenched regions additionally allows for adjustment of the polarization performance of the invention such that not only can the confinement be enhanced but also the loss differential between TE and TM polarizations can be adjusted allowing either reduction/elimination of polarization dependent loss (PDL) for the waveguide bend alone or compensating for the PDL of other elements of the integrated circuit containing waveguide structure 501.

A person of skill in the art will appreciate that care should be taken in designing the waveguide structure. If the transition region 520 and 530 is too abrupt to permit the energy of the optical signal to remain in a lowest order single mode then energy will be transferred to unwanted higher order modes. This transfer of energy is not desirable and in many cases, energy transferred to the higher order mode will be lost. Additionally, if there is a set of weakly confined waveguides that are closely spaced then it is very important to minimize the excitation of higher order modes in order to minimize crosstalk.

Further it would be evident to one skilled in the art that the confinement is optionally adjusted by changing the length and/or spacing of the plurality of trenches. Hence, rather than adjusting the distance of a trench from a waveguide a designer can leave the distance as a constant and in one instance, adjust the length of the each trenches, shorter for lower improvement in confinement and longer for increased improvement in confinement, and in a second instance keep the trenches of fixed length and distance from the waveguide but now space them further apart for low improvement in confinement to close for increased improvement in confinement. It would further be evident that a combination of length, spacing and distance can be employed and that different combinations may benefit in different waveguide layouts according to application.

Figure 6:
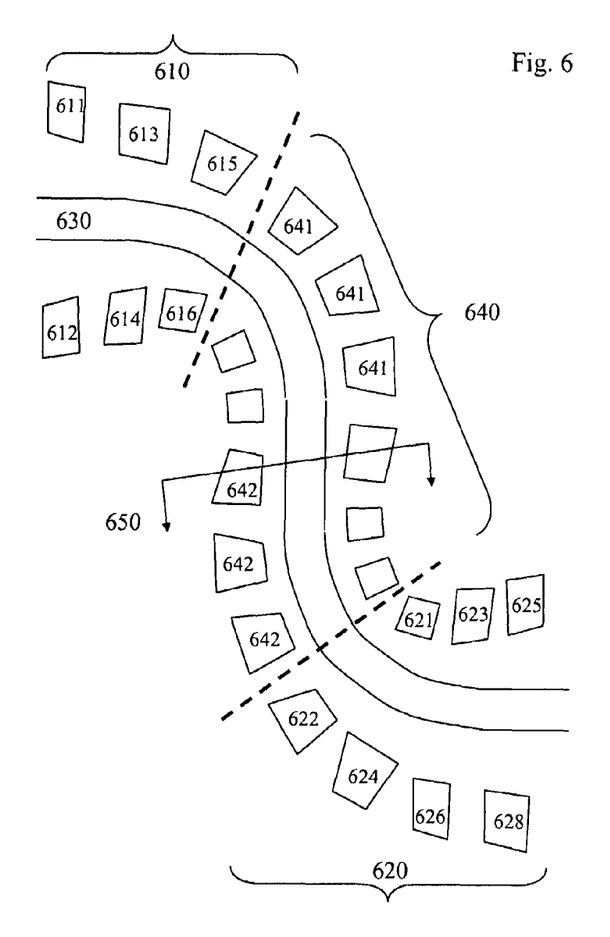
FIG. 6 is a top view of a curved waveguide structure according to another embodiment of the invention featuring a trench disposed on either side of the curved waveguide.

Referring to FIG. 6, a second embodiment of the invention is shown featuring a curved, buried waveguide 630 with trenches positioned along either side of the waveguide 630. This structure features an "S" bend which for ease of presentation may be considered split into three sections according to the trench positioning, these being 610, 620 and 640. Also shown is a section line 650, which is described in FIG. 7 below.

Considering firstly the transition section 610 here the waveguide 630 transitions from a straight waveguide portion to the beginning of the first curved element. Within this transition a first series of trenches 611, 613, and 615 are shown on the upper side of the waveguide 630, and a second series of trenches 612, 614 and 616 shown on the lower side. The separation from the straight waveguide portion varying with distance propagated along the waveguide 630, trenches 611 and 612 being the largest, trenches 613 and 614 closer, and trenches 615 and 616 the closest. As the trench distance reduces then the effective confinement of an optical signal propagating within the waveguide is increased as advantageously required for enabling low insertion loss and small radius curved waveguides.

At this point the confinement of the optical signal within the waveguide 630 is at the highest according to the design space of trench spacing, length and distance. The optical signal now propagates into the main portions of the first curved element and second curved element. Here the waveguide has a plurality of trenches 641 disposed to the upper side and a plurality of trenches 642 on the lower side. The trenches 641 and 642 being designed to maintain the confinement at the end of the first section 610 as it transitions to second section 640.

Upon exiting the second portion 640 and transitioning to the third portion 620 the waveguide transitions from the second curved portion to the output straight waveguide. In the third portion the waveguide 630 has disposed to the upper side trenches 621, 623, and 625, whilst on the lower side 622, 624, 626, and 628. In a reverse of the first section 610 the spacing of the trenches from the waveguide such that trenches 621 and 622 are closest, trenches 623 and 624 spaced further away until finally the waveguide transitions back to an untrenched region and optical signals propagate forward with the confinement derived by the waveguide alone.

Figure 7:
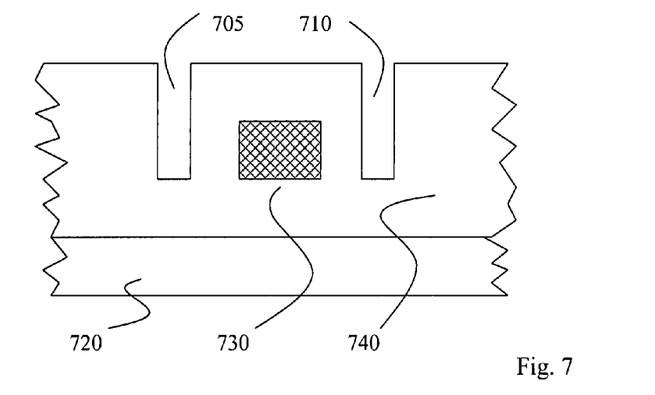
FIG. 7 is a section view of the curved waveguide structure of FIG. 6.

Referring to FIG. 7 a section view of a buried waveguide consistent with section line 650 of FIG. 6 is shown. The section view shows: a waveguide core 730, cladding 740, a substrate 720, and trenches 705 and 710. In order to enhance confinement of an optical signal propagating within the waveguide core 730, a low numerical index material is present within the trenches 705 and 710. Since the buried waveguide features a waveguide core 730 that is surrounded by cladding 740 the resulting waveguide structure is often considered more strongly guiding than a conventional ridge waveguide structure as described with reference to FIG. 2. Clearly, a wide variety of parameters, such as the numerical index for the various materials and the geometry of the waveguide, are used to produce the desired waveguiding properties. Despite having relatively stronger guiding than a ridge waveguide structure, it is still often the case that the waveguide core 612 is curved and that the radius of curvature of the curve is quite limited. By disposing trenches proximate the curved region of the waveguide a higher index contrast is generated resulting in better confinement of an optical signal proximate the waveguide core 730.

Figures 8, 9:
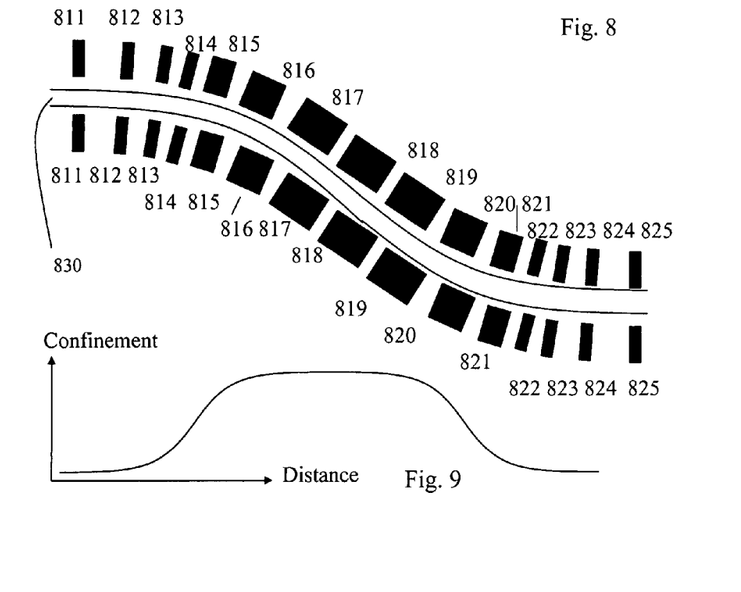

Referring to FIG. 8 shown is a top view of a curved waveguide according to another embodiment of the invention featuring trenches of varying length and spacing disposed on either side of the curved waveguide.

Shown is an S-bend curved waveguide 830, which has disposed laterally to either side a series of trenches 811 to 825. Upon transitioning from the preceding straight waveguide section to the beginning of the curved waveguide 830 the optical signal encounters firstly a short pair of trenches 811 followed by a second pair of trenches 812 spaced along the waveguide with relatively large spacing. These provide a relatively small increase in confinement to the optical signal. As the optical signal it propagates past further trenches 813 and 814 of same width but decreasing spacing as the confinement increases. As the optical signal propagates it now passes trenches 815, 816, and 817 that are of increasing length and fixed gap between such that the confinement increases further to the maximum as the signal passes trenches 817 and 818. At this point in the exemplary illustration the signal has reached the middle of the curved waveguide and now propagates through the second section back to the output straight waveguide. In doing so the optical signal passes trenches 819, 820, 821, 822, 823, 824 and 825 which are the same design as 817, 816, 815, 814, 813, 812, and 811 respectively. In this manner the confinement is reduced in an adiabatic manner the reverse of the adiabatic increase as described with reference to FIG. 9.

Although a variety of methods are available to form the trench, it is suggested that the trench be formed in a deep etching process. Deep etching is well established and understood by those of skill in the art of waveguide substrate fabrication. Additionally, a deep etching process is often used to form other features in a waveguide substrate, such as turning mirrors and grating facettes. Clearly, other methods of forming trenches are equally applicable to the invention.

The features used to help confine light to a waveguide region of a waveguide substrate as described with reference to the previous embodiments are referred to as trenches. Clearly, the description of the feature is not nearly as important as the function of the feature and therefore other features providing similar functionality are also referred to as a trench for the purposes of this document. For example, the features described as trenches in various embodiments of the invention are optionally provided with sufficient depth that they perforate the entire device. Thus, a properly shaped hole is used in place of a trench. As a person of skill in the art will be aware, this is merely a choice of words and should not be viewed as limiting the invention accordingly.

A person of skill in the art of waveguide design may envision numerous other embodiments of the invention without departing from the spirit or scope of the invention. For example, having reviewed the embodiments of the invention, it is within the capability of a person of skill in the art of computer programming and optical design to provide a computer program for designing curved waveguides.

What is claimed is:

1. A waveguide structure comprising:
a substrate;
an integrated waveguide, defined by a core surrounded by cladding supported by the substrate, comprising:
a first straight waveguide for receiving an optical signal for propagation in a direction of propagation;
a curved waveguide having a local radius of curvature, an input optically coupled to the straight waveguide, and an output; and
a second straight waveguide optically coupled to the output of the curved waveguide and for the optical signal propagated through the first straight waveguide and curved waveguide; and,
a plurality of first trenches spaced apart in the direction of propagation disposed in the cladding along a first side of at least the curved waveguide, the first trenches disposed substantially the same distance from the curved waveguide, the plurality of spaced apart first trenches defining trenched and untrenched sections of the cladding, whereby light in the curved waveguide propagates alternately past trenched and untrenched sections, the trenched sections having a material within where the material has a lower index of refraction than at least one of a waveguide core of the curved waveguide and a waveguide cladding of the curved waveguide, at least some of the plurality of first trenches disposed to provide enhanced confinement of the optical signal in a region proximate the curved waveguide, said enhanced confinement being higher than a confinement of the curved waveguide absent said trenches.

2. A waveguide structure according to claim 1, further comprising: a plurality of second trenches disposed substantially the same distance from the curved waveguide along an other side of the curved waveguide, the plurality of spaced apart second trenches defining trenched and untrenched sections, whereby light in the curved waveguide propagates alternately past trenched and untrenched sections, the plurality of second trenches having a material therein having a lower index of refraction than at least one of the waveguide core and waveguide cladding, and wherein, at least some of the plurality of second trenches disposed to provide enhanced confinement of the optical signal in a region proximate the curved waveguide, said enhanced confinement being higher than a confinement of the curved waveguide absent said second trenches.

3. A waveguide structure according to claim 1, wherein the first trenches are arranged in at least one of the arrangements selected from the group consisting of: the length of each of the first trenches is constant, while lengths of the untrenched sections between the first trenches vary; and the lengths of the untrenched sections between each of the adjacent first trenches is constant, while lengths of the first trenches vary.

4. A waveguide structure according to claim 1, wherein the plurality of first trenches provide a variation in confinement along the waveguide structure by an arrangement selected from the group consisting of: each of the first trenches having different lengths; and the lengths of the untrenched sections between the first trenches being different.

5. A waveguide structure according to claim 4, wherein the variation of the confinement is from a first increase of confinement at the input port of the curved waveguide to a second higher increase of confinement at the middle of the curved waveguide and to a third increase of confinement at the output port of the curved waveguide, wherein the third increase in confinement is less than the second increase in confinement.

6. A waveguide structure according to claim 4, wherein the variation of the confinement is from a first increase of confinement at the first straight waveguide to a second higher increase of confinement at the output port of the curved waveguide.

7. A waveguide structure according to claim 4, wherein the variation of confinement is dependent upon of the local radius of the curved waveguide.

8. A waveguide structure according to claim 1, further comprising: a second waveguide disposed on a side of the plurality of first trenches opposite the curved waveguide, the second waveguide integrated with the waveguide structure.

9. A waveguide structure according to claim 8, further comprising: a plurality of third trenches disposed along a second side of the second waveguide, the plurality of third trenches having a material disposed therein in which said material has a lower index of refraction than at least one of the waveguide core and waveguide cladding of the second waveguide; wherein, at least some of the plurality of third trenches are disposed to provide enhanced confinement of the optical signal, said enhanced confinement being higher than a confinement of the optical signal within the second waveguide absent said plurality of third trenches.

10. A waveguide structure according to claim 1, further comprising: a third waveguide disposed on a side of the plurality of second trenches opposite the curved waveguide, the third waveguide integrated with the waveguide structure.

11. A waveguide structure according to claim 10, further comprising: a plurality of fourth trenches disposed along a side of the third waveguide opposite the second trenches, the plurality of fourth trenches having a material disposed therein where the material has a lower index of refraction than at least one of the waveguide core and waveguide cladding; wherein, at least some of the plurality of fourth trenches disposed to provide enhanced confinement of the optical signal in a region proximate the curved waveguide, said enhanced confinement being higher than a confinement of the curved waveguide absent said trenches.

12. A waveguide structure according to claim 1, wherein the local radius of curvature of the curved waveguide when expressed as a function of a distance that light propagates within the curved waveguide has an approximately continuous first order derivative.

13. A waveguide structure according to claim 1, wherein the local radius of curvature of the curved waveguide when expressed as a function of a distance that light propagates within the curved waveguide has an approximately continuous second order derivative.

14. A waveguide structure according to claim 1, wherein the substrate comprises at least one of indium phosphide, gallium arsenide, and silicon.

15. A waveguide structure according to claim 1, wherein the waveguide is at least one of a ridge wave guide and a buried waveguide.

16. A waveguide structure according to claim 1, wherein at least one of the plurality of first trenches perforates at least one of the surface of the structure and the substrate.

17. A waveguide structure according to claim 2, wherein at least one of the plurality of second trenches perforates at least one of the surface of the structure and the substrate.

18. A waveguide structure according to claim 8, wherein at least one of the plurality of third trenches perforates at least one of the surface of the structure and the substrate.

19. A waveguide structure according to claim 11, wherein at least one of the plurality of fourth trenches perforates at least one of the surface of the structure and the substrate.

20. A waveguide structure according to claim 1, wherein at least one of the plurality of first trenches is covered by at least one of a cladding layer and a passivation layer, such that the at least one of the plurality of first trenches does not perforate the surface of the structure.

21. A waveguide structure according to claim 2, wherein at least one of the plurality of second trenches is covered by at least one of a cladding layer and a passivation layer, such that the at least one of the plurality of second trenches does not perforate the surface of the structure.

22. A waveguide structure according to claim 8, wherein at least one of the plurality of third trenches is covered by at least one of a cladding layer and a passivation layer, such that the at least one of the plurality of third trenches does not perforate the surface of the structure.

23. A waveguide structure according to claim 11, wherein at least one of the plurality of fourth trenches is covered by at least one of a cladding layer and a passivation layer, such that the at least one of the plurality of fourth trenches does not perforate the surface of the structure.

24. A waveguide substrate according to the claim 1, wherein the material with a low index of refraction comprises at least one of air and a material forming at least part of a passivation layer.

25. A waveguide substrate according to the claim 2, wherein the material with a low index of refraction comprises at least one of air and a material forming at least part of a passivation layer.

26. A waveguide substrate according to the claim 8, wherein the material with a low index of refraction comprises at least one of air and a material forming at least part of a passivation layer.

27. A waveguide substrate according to the claim 11, wherein the material with a low index of refraction comprises at least one of air and a material forming at least part of a passivation layer.

28. A waveguide structure according to claim 1, wherein the resulting waveguide propagates an optical signal with minimal polarization dependent loss.

29. A waveguide structure according to claim 2, wherein the resulting waveguide propagates an optical signal with minimal polarization dependent loss.

30. A waveguide structure according to claim 1, wherein the resulting waveguide propagates an optical signal with a predetermined polarization dependent loss.

31. A waveguide structure according to claim 2, wherein the resulting waveguide propagates an optical signal with a predetermined polarization dependent loss.

32. A waveguide structure according to claim 1, further comprising: at least one fifth trench spaced apart from the first trenches in the direction of propagation disposed along a first side of the curved waveguide, each of the fifth trenches disposed at a distance from the curved waveguide farther than the first trenches, the spaced apart first and fifth trenches defining trenched and untrenched sections, whereby light in the curved waveguide propagates alternately past trenched and untrenched sections.

33. A waveguide structure according to claim 2, further comprising: at least one sixth trench spaced apart from the second trenches in the direction of propagation disposed along the other side of the curved waveguide, each of the sixth trenches disposed at a distance from the curved waveguide farther than the second trenches, the spaced apart second and sixth trenches defining trenched and untrenched sections, whereby light in the curved waveguide propagates alternately past trenched and untrenched sections.

* * * * *